Oct. 15, 1968 J. A. GREGOIRE 3,405,901
SUSPENSION FOR VEHICLE SEATS
Filed July 5, 1966 3 Sheets-Sheet 1

INVENTOR
JEAN ALBERT GREGOIRE
BY Young & Thompson
ATTYS.

Oct. 15, 1968  J. A. GREGOIRE  3,405,901
SUSPENSION FOR VEHICLE SEATS

Filed July 5, 1966  3 Sheets-Sheet 2

INVENTOR
JEAN ALBERT GREGOIRE
By Young & Thompson
ATTYS.

3,405,901
SUSPENSION FOR VEHICLE SEATS
Jean Albert Gregoire, 92 Ave. Niel, Paris 17°, France
Filed July 5, 1966, Ser. No. 562,637
Claims priority, application France, July 9, 1965,
24,171
1 Claim. (Cl. 248—400)

ABSTRACT OF THE DISCLOSURE

A suspension for vehicle seats of the type wherein the seat is connected through two pivotal links with the vehicle body forming a pivoted link system. Two of the four parts forming said system are interconnected by damping means comprising a piston, pivotally connected to the link and the convex head of which engages a concave diaphragm closing a bell-shaped air-filled chamber rigid with the body of the seat. The connection may be reversed or again the pivotal connection may be transferred from the piston to the air-filled chamber.

---

My invention has for its object improved suspension means for vehicle seats, chiefly for seats of the drivers of heavy trucks or tractors or on board ships of the type wherein the pneumatic suspension means are constituted by a deformable chamber containing compressed air or a gas under pressure and which is inserted between the suspended section and the non-suspended section of the seat, while the modifications in volume of the capacity and consequently in its pressure as produced by the unevenesses of the supporting medium ensure the desired suspension effect.

My invention has for its object the provision of suspensions of such a type which are of a simple and comparatively cheap construction, which operate reliably and are of a reduced bulk, while they may be readily adapted to the size and weight of the driver.

To this end and in conformity with my invention, the pneumatic suspension section termed hereinafter the cushion includes a chamber closed by an elastic diaphragm actuated by a piston engaging it through a rounded front surface, without any mechanical connection therewith, so that when the seat moves with reference to the body of the vehicle, the piston exerts a thrust of a more or less considerable intensity on the diaphragm with which it has no further connection beyond a contacting relationship.

The arrangements executed according to my invention may furthermore show one or more of the following features:

One of the elements forming the suspension, to wit the piston, is pivotally secured to its support, round a transverse pivot axis, such that when the two elements act on each other, the axes thereof remain in substantial parallelism and are spaced by only a small extent, if at all.

The transverse axis around which the pivoting element is adapted to rock freely crosses the longitudinal axis of said pivoting element at a point which, according to my invention, is located on the side facing the non-pivoting element of the transverse plane passing substantially through the line of contact beyond which the diaphragm is adapted to move off the piston. Experience has shown in fact that the above-disclosed conditions are essential for ensuring stability of the relative position of the two elements for all the relative positions between the elements of the suspension.

The transverse axis referred to is constituted by two trunnions revolvably secured in the support carrying the pivoting element, said trunnions carrying said pivoting element through the agency of two arms, for instance.

Other objects and features of my invention will appear in the reading of the following description, reference being made to the accompanying drawings illustrating diagrammatically and by way of example, in a non-limiting sense, two embodiments of my invention. In said drawings.

Figure 1:
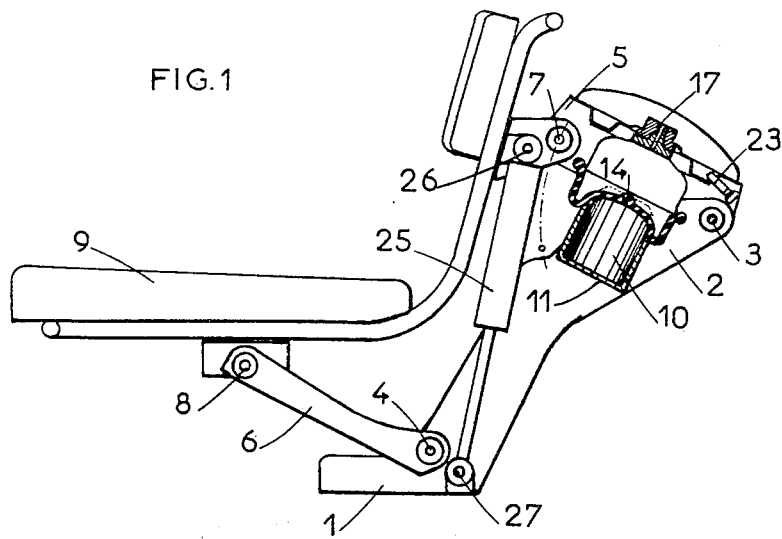
FIG. 1 is a longitudinal sectional partly elevational view of an air spring according to my invention incorporated with the suspension of the seat of a tractor driver.
Figure 2:
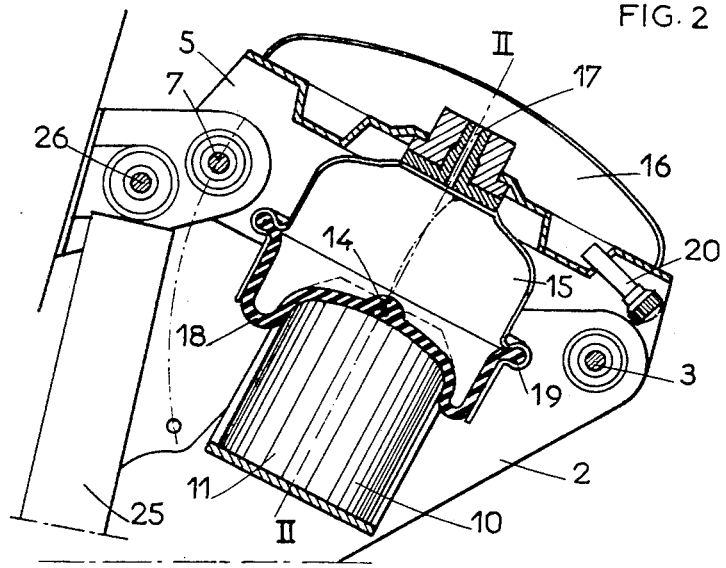
FIG. 2 illustrates on a larger scale the portion of FIG. 1 showing the air spring fitted between the seat and its support.
Figure 3:
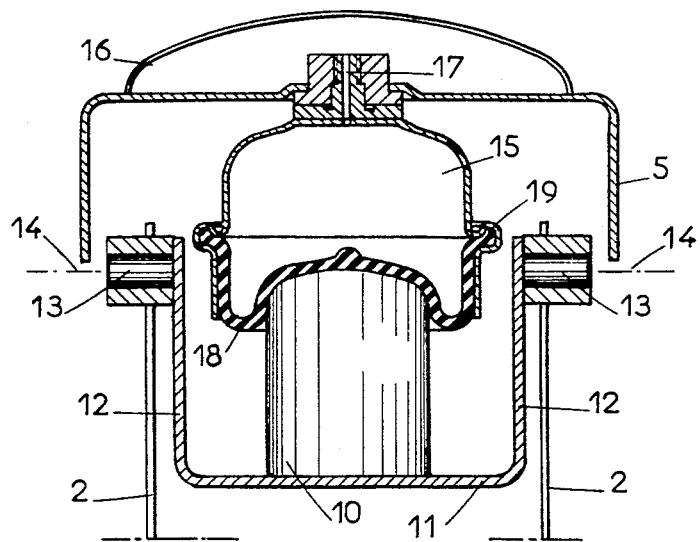
FIG. 3 is a cross-section through line III—III of FIG. 2.

In FIGS. 1, 2 and 3, 1 designates a frame secured to the chassis of a tractor and serving as a support for the seat, said frame including vertical flanges 2. To said frame and flanges there are pivotally secured at 3 and 4 links 5 and 6 to the cross-section of which is given the shape of a U with a broad base, as shown in FIG. 3 for the link 5. Said links are adapted to couple mechanically the seat 9 with the frame 1 while allowing said seat when shifted upwardly and downwardly to remain substantially parallel with its position at the start. The links 5 and 6 are pivotally connected at 7 and 8 respectively with lugs rigid with the seat 9. Between the frame and its flanges 2, on the one hand, and the seat 9, on the other hand, thus connected by a pivotal link system, there is furthermore inserted the pneumatic suspension means or air spring which is the principal feature of my invention. Said pneumatic means illustrated cross-sectionally on a larger scale in FIGS. 2 and 3 is constituted by two elements adapted to move with reference to each other, to wit: the piston 10 and cushion 15–16.

The piston 10 is carried by the lower section or web 11 of a strap (FIG. 3) the upstanding arms 12 of which carry trunnions 13 revolvably carried by the flanges 2 of the frame 1, so that the piston is adapted to rock in practice around the pivotal axis 14, 14 of the trunnions. The cushion is secured to the link 5 substantially at midlength of said link. It encloses a first chamber 15 and a second chamber 16 communicating with the former chamber through a port 17 in the link 5 separating the chambers and the diameter of which ranges substantially between 1 and a few millimeters, so as to be large enough to prevent any braking of the passage of air between the two chambers.

The first-mentioned chamber 15 is constituted by a bell-shaped member the lower opening of which is closed by a diaphragm 18 made of an elastic material such as unreinforced rubber, the peripheral edge of the bell-shaped member being clamped at 19 within the edge of the opening of the bell-shaped member. On the other hand, the chamber 16 is formed inside a rigid container of which the volume is consequently unvarying. The associated chambers 15 and 16 closed by the diaphragm 18 form therefore a fluid-tight chamber of which the volume is variable when the diaphragm is deformed, as will be disclosed hereinafter.

The chamber 16 is furthermore provided with a connection or with a valve 20 which allows introducing into the chamber or removing therefrom compressed air when required for the reasons given hereinafter.

Figure 4:
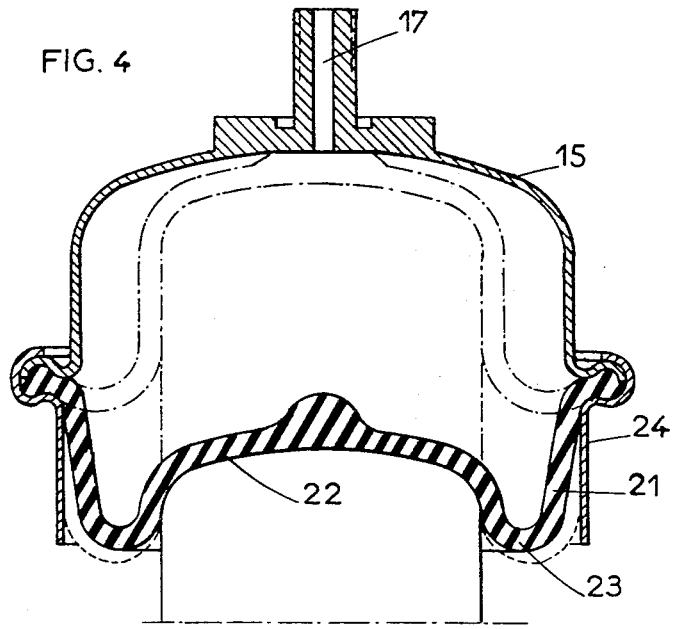
FIG. 4 is a cross-section on a still larger scale of the air spring unit constituted by a piston and cushion showing more clearly the shape of the diaphragm under different operative conditions.

The diaphragm 18 is constructed in a manner such that when inoperative, that is when subjected to the same pressure on both sides without being subjected to any action on the piston, it assumes a shape such as that illustrated in FIG. 4; in other words, it includes a substantially frusto-conical peripheral section 21 and a central section 22 bulging in a direction facing away from the apex of such a frusto-cone and assuming, generally speaking, the shape of a flattened half-ellipsoid registering substantially, in fact, with the shape of the front section of the piston which is to act on it, said two sections of the diaphragm being interconnected by an annular section 23 in the shape of a half torus.

The bell-shaped member 15 furthermore includes, along the edge in which the diaphragm is set, a cylindrical skirt 24, the part played by which will be disclosed hereinafter.

Furthermore, a shock absorber 25 (FIGS. 1 and 2) of a telescopic type is pivotally connected at its ends 26 and 27 to the seat and to its support respectively.

Said shock absorber, when it has expanded to a maximum extent, forms a stop preventing rebound and holding the piston against any movement urging it further away from the cushion beyond the position illustrated in FIG. 2, so that in on case, when the suspension is positioned on the vehicle, can the piston move away from the cushion beyond said position thus illustrated in FIG. 2, which position corresponds to the highest possible position of the seat above the vehicle flooring. Said rebound stop may be comprised otherwise than by means of a shock absorber and it is sufficient, as a matter of fact, to make use of any arrangement adapted to limit the upward movement of the seat with reference to the vehicle flooring.

The air-spring suspension may be fitted on the seat in the following manner for instance: the cusion capacity being subjected to atmospheric pressure and the shock absorber being disconnected, the seat is secured to its supporting frame through the pivoted link system, while the piston end is caused to engage the central section of the diaphragm assuming the shape of a hollow half of a flattened ellipsoid.

By reason of the natural shape given to the central section of the diaphragm, the positioning of the piston with reference to the diaphragm is obviously obtained without any difficulty, which would not be the case if the diaphragm were given a convex shape, since it would be difficult to suitably position at the start the piston with reference to such a convex diaphragm, and it would be in fact necessary to hold by hand said piston in the desired position with reference to the diaphragm; furthermore, the piston would tend to lose its initial position with reference to such a convex diaphragm when subjected to pressure introduced inside the cushion by means of a hand-operated pump, for instance, associated with the valved connection provided for the cushion, so that the diaphragm is deformed and assumes the position illustrated in interrupted lines in FIG. 4; in other words, its frusto-conical edge has a tendency to engage the skirt 24 while the central section of the diaphragm is held in position over the piston, since the rebound stop formed by the shock absorber when expanded to a maximum extent prevents any further movement of the diaphragm away from the piston. Upon continuation of the introduction of air inside the cushion, the pressure of the latter rises speedily until it reaches the desired value compensating the weight of the driver. When the driver is seated on his seat, the latter has obviously a tendency to be lowered upon deformation of the pivotal four-sided system 3, 4, 7, 8; during said lowering, the movement of the link 5 urges the two elements of the air spring towards each other, so that the piston 10 acts on the diaphragm 18 and depresses the latter inside the bell-shaped member, which increases the pressure in the chamber 15 enclosed by the latter.

The suspension may thus play the part consisting in absorbing the stresses produced by the unevenesses of the road, the piston then acting on the diaphragm so as to allow a shifting of the seat with reference to its supporting frame. During such movements, the extension or skirt 24 prevents the diaphragm from expanding outwardly.

To ensure a proper operation of the cushion, it is preferable, as shown by experience, for the ratio between the diameter of the skirt and that of the piston to range between say 1.4 and 1.8.

The shock absorber furthermore ensures in a well-known manner a damping of the oscillatory movements of the suspension. It should be remarked that, since the piston is adapted to rock around its axis 14, 14 it has a tendency to be positioned constantly during its movement with reference to the cushion in a manner such that its own axis remains parallel with the cushion axis or coincides with the latter.

Furthermore, since the oscillatory axis 14, 14 of the piston passes, as illustrated in FIG. 3, very near the upper end of the piston, there is no risk of a rocking of the piston with reference to the cushion, as a consequence of the oscillation of the piston round said axis 14, 14. Said stability is ensured in practice provided the axis 14, 14 extends as illustrated in FIG. 3 above the plane defining the contact between the diaphragm and the piston when the diaphragm moves off the piston.

As is apparent from inspection of the drawings and as already mentioned, the cushion is secured to the link 5, at a point such that its shifting may comprise only a fraction of the shifting of the seat with reference to the vehicle flooring. The result is that, in order that the air spring may be capable of bearing the driver's weight, the pressure should be substantially higher than if the shifting of the cushion were equal to that of the seat.

In practice, the total shifting of the seat between its outer rebound position and its position of maximum collapse corresponding to the position of the diaphragm illustrated in dot-and-dash lines in FIG. 4 and for which the diaphragm engages the inner surface of the bell-shaped member, may be of a magnitude of 10 cm. and even more under static load conditions. The seat may, when normally occupied by the driver, be located at a level lower than the rebound position by about 2.5 to 5.5 cm. depending on the driver's bulk, the adjustment of the pressure depending in such a case on the driver's weight.

In all cases, great comfort is ensured, the frequency of the oscillations varying for instance between 65 and 80 per minute according to the driver's weight.

Figure 5:
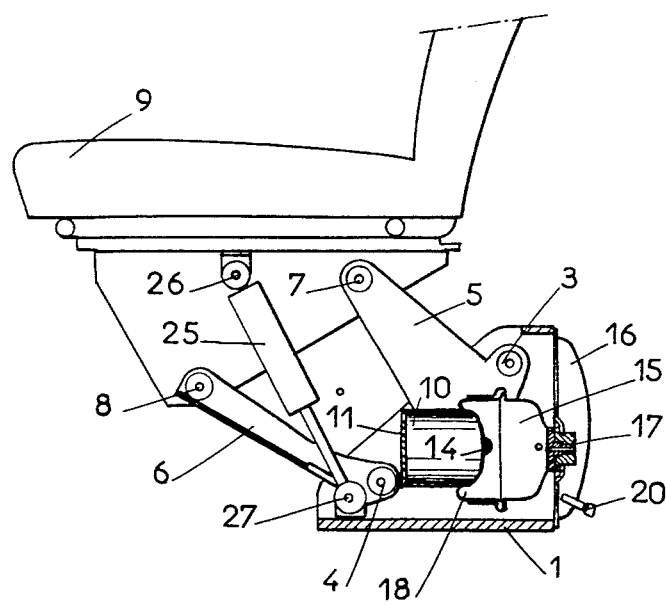
FIG. 5 is a view similar to FIG. 1 of a further embodiment of my invention intended for use for instance with the seat of a tractor or truck driver.

The arrangement illustrated in FIG. 5 includes the same essential components as that of the preceding figures, except for the fact that since the seat is more particularly intended as a seat for a truck driver or the like, more room is available underneath said seat for housing therein the actual suspension means. In such a case, the piston and cushion system instead of being arranged vertically is arranged horizontally, as shown in FIG. 5 and it furthermore faces rearwardly.

The cushion which is permanently fitted on the support 1 which is secured in its turn to the vehicle flooring, remains therefore stationary, while the piston moves with the connecting rod 5 with reference to which it may rock around its oscillatory axis.

The cushion may be connected directly by its connection 20 with a tapping feeding compressed air through the agency of a three-way cock for instance, which allows either exhausting air from or admitting air into the chamber. Instead of a three-way cock it is also possible to provide two separate parts: one two-way cock for admission of air and another for its exhaust.

It is apparent that the pneumatic system thus executed forms an independent unit adapted to receive seats of all types and shapes provided if required with a slideway along which the position of the seat is longitudinally adjustable and with means for adjusting the slope of the seat back.

In the two embodiments disclosed, the piston rocks around the axis of its trunnions in a manner such that its axis extends in parallelism with the cushion axis. In the first embodiment, the cushion is carried by a link, while the piston is carried by the stationary support or frame, whereas in the second embodiment the cushion is rigidly carried and the piston is carried by one of the links.

The oscillatory axis of the piston should preferably be located in all cases in accordance with the requirements to be fulfilled as mentioned hereinabove, so as to ensure stability of operation for the system.

In the example illustrated, there is furthermore provided a chamber of a constant volume 16 arranged above the bell-shaped member. The use of such an auxiliary chamber shows the advantage consisting in that it is possible to replace said chamber by a chamber of a different volume, so as to make the pneumatic suspension suit vehicles provided with a mechanical suspension having different characteristic properties.

According to my invention, it is also possible, if required, to omit said auxiliary chamber by resorting to a single chamber the volume of which may be larger than that corresponding to the total volume of both capacities of the prior examples.

What I claim is:

1. A suspension for a vehicle seat fitted between the seat and the vehicle body, comprising a pivotal link system including four pivotally interconnected elements constituted by the seat and the body and links pivotally connected with the seat and with the body and an air spring fitted between two of the four elements of the pivotal link system and including an air-filled chamber fixed to one of said two elements and formed by a hollow support and a convex diaphragm closing said support, a piston having a convex head that engages and indents the diaphragm in permanent free contacting relationship therewith, and means mounting the piston on the other of said two elements for pivotal movement about an axis that passes through said chamber when the diaphragm is about to disengage the piston.

References Cited

UNITED STATES PATENTS

| | | | |
|---|---|---|---|
| 1,288,447 | 12/1918 | Seibel | 248—399 XR |
| 1,529,138 | 3/1925 | Kuentzel | 248—399 |
| 2,432,554 | 12/1947 | Knoedler | 248—399 |
| 2,531,572 | 11/1950 | Knoedler | 248—400 XR |
| 2,879,829 | 3/1959 | Lavoie et al. | 267—1 |
| 3,150,855 | 9/1964 | Carter et al. | 248—400 |
| 3,233,859 | 2/1966 | Beoletto | 248—399 |

ROY D. FRAZIER, *Primary Examiner.*

R. P. SEITTER, *Assistant Examiner.*